United States Patent
Takayasu (10) Patent No.: US 9,105,396 B2
(45) Date of Patent: Aug. 11, 2015

(54) SUPERCONDUCTING FLAT TAPE CABLE MAGNET

(71) Applicant: Makoto Takayasu, Lexington, MA (US)

(72) Inventor: Makoto Takayasu, Lexington, MA (US)

(*) Notice: Subject to any disclaimer, the term of this patent is extended or adjusted under 35 U.S.C. 154(b) by 65 days.

(21) Appl. No.: 14/047,115

(22) Filed: Oct. 7, 2013

(65) Prior Publication Data

US 2014/0243207 A1 Aug. 28, 2014

Related U.S. Application Data (60) Provisional application No. 61/710,062, filed on Oct. 5, 2012.

(51) Int. Cl.
| | | |
|---|---|---|
| *H01F 6/06* | (2006.01) | |
| *H01F 41/06* | (2006.01) | |
| *H01F 41/04* | (2006.01) | |

(52) U.S. Cl.
CPC .............. *H01F 41/0629* (2013.01); *H01F 6/06* (2013.01); *H01F 41/048* (2013.01)

(58) Field of Classification Search
CPC .... H01B 12/00–12/16; H01B 13/08–13/0875; H01L 39/02–39/09; H01L 39/12; H01L 39/125
See application file for complete search history.

(56) References Cited

U.S. PATENT DOCUMENTS

| | | |
|---|---|---|
| 3,365,538 A | 1/1968 | Voigt |
| 3,428,926 A | 2/1969 | Bogner et al. |
| 4,377,905 A * | 3/1983 | Agatsuma et al. .............. 29/599 |
| 5,514,877 A | 5/1996 | Nakamura et al. |
| 5,929,385 A | 7/1999 | Sugimoto et al. |
| 6,562,761 B1 | 5/2003 | Fritzemeier et al. |
| 6,671,953 B2 | 1/2004 | McAninch et al. |
| 8,437,819 B2 | 5/2013 | Takayasu et al. |
| 2003/0029629 A1 | 2/2003 | Spreafico et al. |
| 2004/0000421 A1 | 1/2004 | Reis et al. |
| 2004/0082482 A1 | 4/2004 | Rey |
| 2004/0200637 A1 | 10/2004 | Yumura et al. |
| 2005/0050905 A1 | 3/2005 | Bonaquist et al. |
| 2006/0073975 A1 | 4/2006 | Thieme et al. |
| 2006/0238928 A1 | 10/2006 | Iwakuma et al. |
| 2006/0293189 A1 | 12/2006 | Ries |
| 2008/0180202 A1* | 7/2008 | Otto et al. ..................... 335/284 |
| 2010/0099570 A1 | 4/2010 | Takayasu et al. |
| 2010/0099571 A1 | 4/2010 | Usoskin |
| 2012/0214675 A1 | 8/2012 | van der Laan |
| 2012/0214676 A1 | 8/2012 | Matsushita |
| 2014/0302997 A1 | 10/2014 | Takayasu |

OTHER PUBLICATIONS

International Search Report and Written Opinion mailed Dec. 4, 2014 in co-pending PCT application No. PCT/US14/32777.

(Continued)

*Primary Examiner* — Colleen Dunn
(74) *Attorney, Agent, or Firm* — Nields, Lemack & Frame, LLC (57) ABSTRACT

A method for winding a coil magnet with the stacked tape cables, and a coil so wound. The winding process is controlled and various shape coils can be wound by twisting about the longitudinal axis of the cable and bending following the easy bend direction during winding, so that sharp local bending can be obtained by adjusting the twist pitch. Stack-tape cable is twisted while being wound, instead of being twisted in a straight configuration and then wound. In certain embodiments, the straight length should be half of the cable twist-pitch or a multiple of it.

17 Claims, 8 Drawing Sheets

(a) Twisted stacked-tape cable showing the locations of easy bending and (b) difficult bending along the cable. (c) Cable winding of the stacked tape twist-wind method on pentagonal and hexagonal cylinders, respectively.

(56) References Cited

OTHER PUBLICATIONS

"Advanced Cable Project", Los Alamos National Laboratory, Dec. 2010, 69 pages, accessed online @ URL http://www.htspeerreview.com/pdfs/presentations/day%202/applications/2AP_Advan.pdf, Ashworth, et al.

International Search Report and Written Opinion mailed Feb. 17, 2010 in PCT application No. PCT/US2009/047961.

International Preliminary Report on Patentability mailed Apr. 21, 2011 in PCT application No. PCT/US2009/047961.

IEEE Transactions on Applied Superconductivity, vol. 23, No. 3, Jun. 2013, 4 pages, "Conductor Characterization of YBCO Twisted Stacked-Tape Cables", Takayasu, et al.

Office Action mailed Feb. 11, 2015 in co-pending U.S. Appl. No. 14/243,008.

* cited by examiner

Figure 1. Illustration of fabrication method of twisted multi-layer tape conductor (a) Stacking of multi-layer tape-shaped wires. (b) Twisted multi-layer tape conductor.

Figure 2. (a) Twisted stacked-tape cable showing the locations of easy bending and (b) difficult bending along the cable. (c) Cable winding of the stacked tape twist-wind method on pentagonal and hexagonal cylinders, respectively.

Figure 3. A U-turn portion of one turn of a saddle coil of a curved saddle winding on a 50 mm diameter tube. The cable is composed of 50 YBCO tapes, each 4 mm wide by 0.1 mm thick.

Figure 4. Twisting direction of every quarter-turn section of one turn coil can be selected to obtain the asymmetrical and ideal winding cabling.

Figure 5. (a) 50 tape, 2.5 turn superconductor coil composed of 0.1 mm thick, 4 mm wide YBCO tapes wound on a 165 mm diameter pentagon cylinder. (b) Enlarged view of a 3D sharp bending section.

Figure 6. Twist-pitch length of each arm for different lengths can be selected within the range of strain tolerances of the superconductor wires during winding a coil.

Figure 7. (a) A single stack cable. (b) Three bundles cable composing three single stack cables. (c) Tape surfaces of all cables should be paralleled to the bending surface.

Figure 8. Conductor support sheathes to support electromagnetic force for magnet operation. (a) Helically slit flexible sheath of a round-diameter with a square hole along its axis. (b) Open square groove on a round rod with partial helical cut slits. (c) Short sheath having a partially twisted open or closed square channel (open channel is shown).

SUPERCONDUCTING FLAT TAPE CABLE MAGNET

This application claims priority to U.S. provisional application Ser. No. 61/710,062 filed Oct. 5, 2012, the contents of which are incorporated herein by reference in their entirety.

This invention was made with government support under Grant No. DE-FC02-93ER54186 awarded by the U.S. Department of Energy. The government has certain rights in this invention.

FIELD

Embodiments disclosed herein relate to superconducting cable magnets made from flat tape superconducting wires. Embodiments disclosed herein also relate to a winding method for superconductor cable such as a High Temperature Superconducting (HTS) tape-cable, such as 2G Rare Earth Elements-Barium-Copper-Oxide (REBCO) thin flat tapes and BSCCO tapes, which is applicable to a flat tape cable of Twisted stacked-Tape Cabling (TSTC) disclosed in U.S. Pat. No. 8,437,819, the disclosure of which is hereby incorporated by reference.

BACKGROUND

Extensive worldwide effort has been devoted over the last decade to the development of High Temperature Superconductor (HTS) wires such as BSCCO-2223, BSCCO-2212 and REBCO, such as YBCO, in the production of second-generation (2G) HTS flat tapes for various electronic device applications such as transformers, fault current limiters, energy storage, magnets and power transmission cables. These practical applications demand high current capacities that can be achieved only with HTS superconductors.

REBCO tapes in particular would be very useful for the next generation high-field magnets due to the high engineering-current-density at high magnetic fields. Currently most devices using HTS tapes have been using configurations employing a single tape or only a few tapes in parallel.

Recently, however, a few different types of cabling methods for HTS tapes have been developed for magnets. Furthermore, the field-orientation dependence (critical current anisotropy) of YBCO tapes has been substantially improved using a REBCO HTS film technique employing doping with Gd and Zr. The reduced field-orientation sensitivity allows more flexibility in using HTS tapes for high field magnets.

It is noted that 2G HTS tapes, such as YBCO tapes, have excellent mechanical properties with respect to axial and torsional strains, as well as high current density at high magnetic field. The 2G HTS tapes will be very attractive for high field superconducting magnet applications such as various industrial magnet devices for compact synchrocyclotrons, MRI, NMR, SMES, transformers, fault current limiters and generators, and accelerator magnets including dipoles, quadrupoles, and corrector magnets.

At present, the practical high-field superconducting wires are mainly based on $Nb_3Sn$ wire technology. The performance of this wire and magnet technology has been significantly improved recently, however, the high field performance of this type of conductor is limited. The only HTS round wire currently available and showing promise for HEP applications is BSCCO-2212. These $Nb_3Sn$ and BSCCO-2212 wires, however, do require careful heat-treatments. Both are brittle and very sensitive to mechanical strains, therefore the react-and-wind method is rarely used to manufacture a coil.

It is desirable to adopt 2G HTS tapes to future high field magnets applications for their excellent high-field performance and less-sensitive mechanical strain characteristics. Although the cost of 2G HTS tapes is still high, cost is not the only reason why 2G HTS tapes are not in use. The flat-tape form is also a challenge for the cabling and winding of a coil.

In response, a new cabling method of a twisted, stacked-tape geometry, called Twisted Stacked-Tape Cabling (TSTC) has been developed. Stacked flat tapes are twisted along the axis of the stack. The cabling method allows development of high current, high-current-density, compact HTS cable conductors. This conductor is also attractive for various applications of High Energy Physics (HEP) accelerator magnets and fusion magnets as well as high power transmission lines, magnets for medical applications, SMES, and other electrical devices.

In embodiments disclosed herein, the TSTC concept is applied to a new coil winding method useful for, for example, a REBCO tape conductor for high field, high current magnet applications. In certain embodiments, the stacked-tape cable is twisted while being wound, instead of being twisted in a straight configuration and then wound on the supporting surfaces. This "Stacked-Tape Twist-Wind" (STTW) coil fabrication method is suitable for complicated three dimensional (3D) winding geometries such as a saddle coils. Furthermore, since the tape cable is twisted, the AC losses and the magnetic field errors due to the screening current can be minimized. Twisting should also improve uniform current distribution among the tapes in the cable.

SUMMARY

Figure 1:
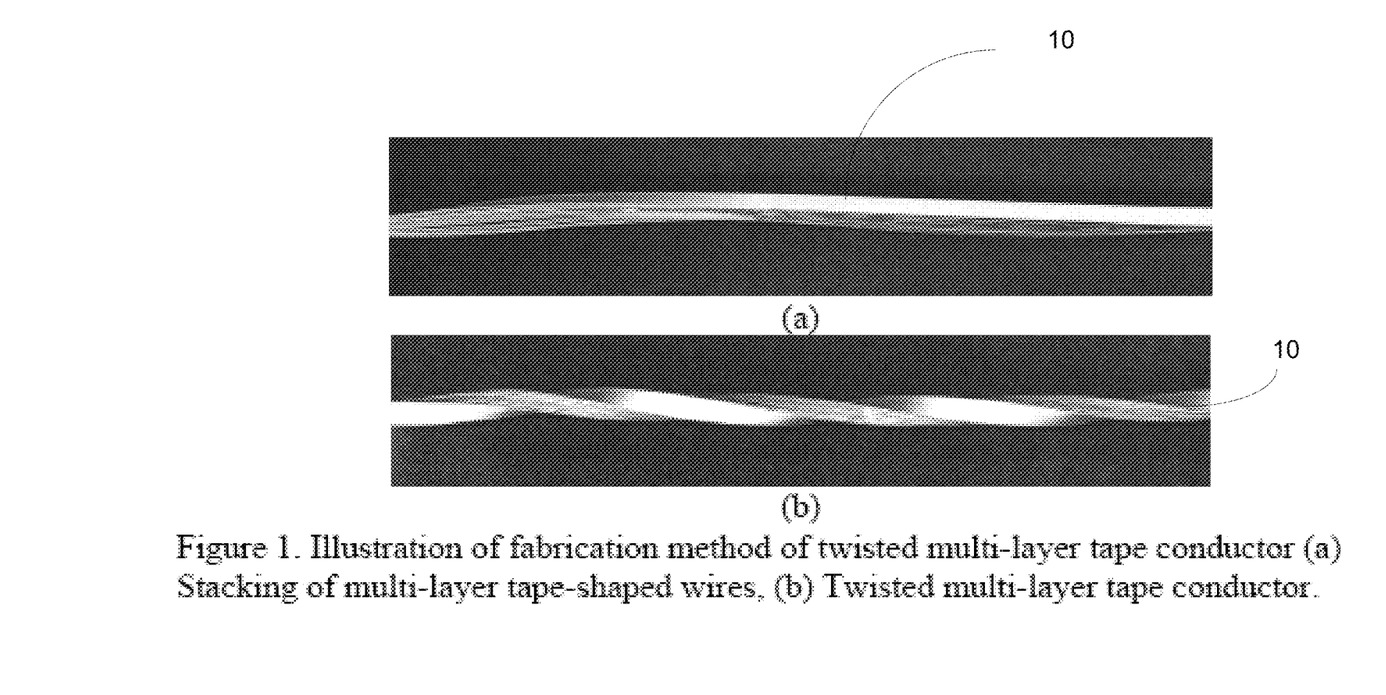
FIG. 1(a) is a perspective view of twisted multi-layer tape conductor fabricated with multi-layered flat tapes by stacking the tapes in accordance with certain embodiments.
FIG. 1(b) is a perspective view of the stacked twisted multi-layered tape conductor of FIG. 1(a) in a twisted configuration in accordance with certain embodiments.

Twisted Stacked-Tape Cable (TSTC) conductor is fabricated with multi-layered flat tapes by stacking the tapes (FIG. 1(a)) and then by twisting the stacked tapes together (FIG. 1(b)) in the range of the strain tolerances of the tape superconductors. Once a TSTC cable is prepared in its twisted configuration, it easily bendable, but only in the locations where the local bending radius is perpendicular to the stack of tapes, and it is difficult to bend in other directions along the cable. Taking this into consideration, embodiments disclosed herein relate to a method for winding a coil magnet with the stacked tape cables based on the concept of the TSTC.

Accordingly, in certain embodiments, the winding process is controlled and various shape coils can be wound (manually or automatically) by twisting about the longitudinal axis of the cable and bending following the easy bend direction during winding, so that sharp local bending can be obtained by adjusting the twist pitch. Twist pitch is defined as the length of a full twist; e.g., when a first surface of the flat tapes is facing upward, the distance from the start of a twist until the first surface of the flat tapes is facing upward again. Stated differently, twist pitch is the distance over which the flat tape is twisted 360°. In certain embodiments, the twist pitch can be locally adjusted based on the coil shape and diameter of the coil.

DETAILED DESCRIPTION

Figure 2:
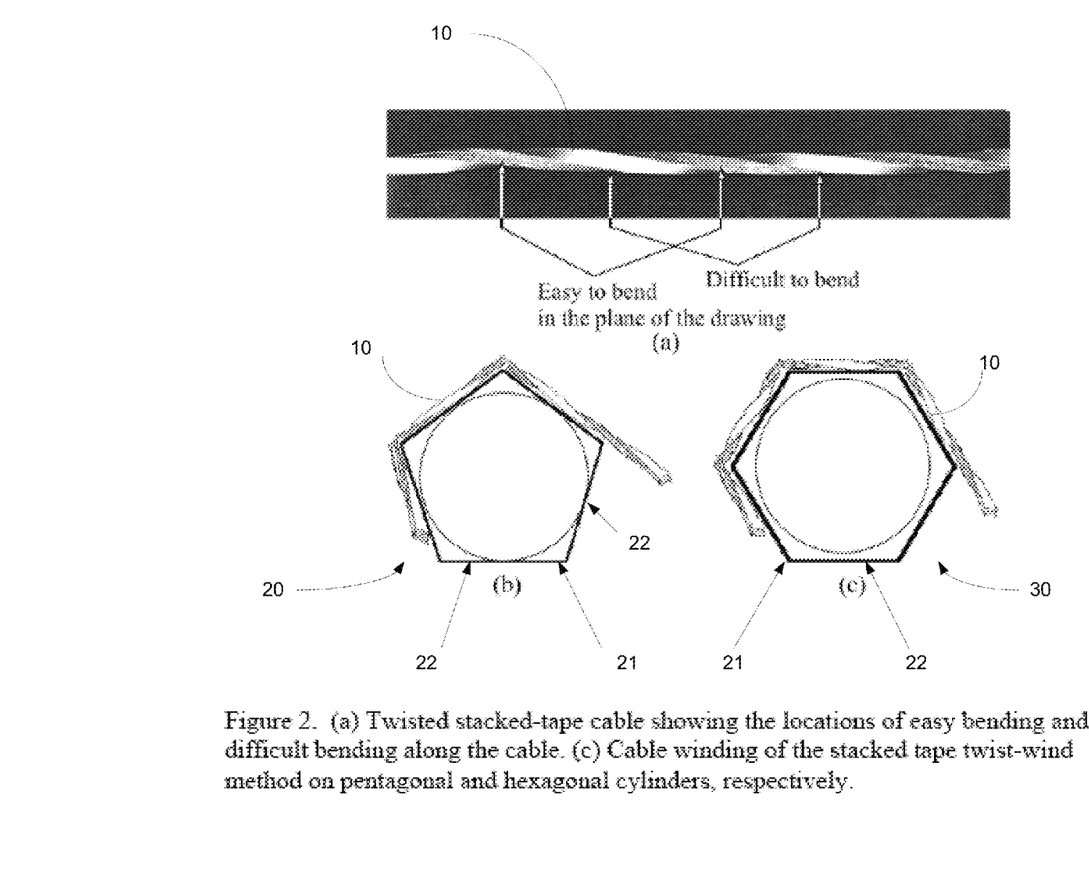
FIG. 2(a) is a perspective view of a twisted stacked-tape cable showing locations of easy bending and hard bending.
FIG. 2(b) is a schematic diagram showing cable winding on a pentagonal cylinder in accordance with certain embodiments.
FIG. 2(c) is a schematic diagram showing cable winding on a hexagonal cylinder in accordance with certain embodiments.

Turning now to FIG. 2(a), there is shown a section of a TSTC conductor 10 and the locations where it can be easily bent in the direction indicated in the figure (drawing plane). In certain embodiments, the stacked-tape cable is composed of multiple superconducting tapes and multiple metallic tape strips. The metallic tapes are used as electric stabilizers and also for mechanical support. Suitable metallic tape material includes copper and aluminum for the electric stabilizers, and steel, stainless steel, titanium, titanium alloy, Inconel and Incoloy for mechanical support. The stacked-tape cable assembly can be loosely wrapped with a fine wire, such as a stainless wire, if required to keep the tape assembly in tact. The locations where the bending is difficult are also indicated. Given this mechanical behavior of the TSTC cable, it is possible to control the winding process and wind various shape coils by twisting and bending following the easy bend direction during winding. Tighter local bending can be obtained by adjusting the twist pitch. The twist pitch can be locally adjusted based on the coil shape and diameter. In certain embodiments, a sharp bending of about 25 mm diameter is achievable for a 50-tape YBCO cable.

FIGS. 2(b) and (c) show examples of cable windings on pentagonal and hexagonal cylinders 20, 30, respectively, using the winding method in accordance with embodiments disclosed herein. It is noted that other shapes are suitable, including triangles, rectangles and octagons. In addition, these cylinders may be in the shape of a polygon. In addition, the polygons may be regular (i.e. equilateral) or may have different length sides. On these cylinder surfaces, a stacked-tape cable 10 can be wound easily by sharply bending the stack of tapes at the corners 21 of a polygon and then twisting along the substantially straight or linear sides 22 of the polygon. In other words, the stack-tape cable 10 is twisted while being wound, instead of being twisted in a straight configuration and then wound on the surfaces. In certain embodiments, the straight length should be half of the cable twist-pitch or an integral multiple of it.

In certain embodiments, the mandrel or supporting surface about which the cable is wound includes one or more corners, bends or curves (e.g., non-linear regions), and one or more substantially straight length regions (e.g., regions without corners or bends) between the corners or bends. A region without a corner, bend or curve is a region where the angle of the bend is less than 180° to a significant enough extent that bending of a twisted cable is difficult. For example, in the case where the mandrel or supporting surface about which the cable is wound is an octagon, the corner or bend region has an angle of bend of 135°, and it is difficult to bend a twisted cable in that region. The twist pitch associated with a particular straight length region is chosen such that the straight length region is equal to half of that twist pitch, or is equal to the same value as the twist pitch, or 3/2 the twist pitch, or twice the twist pitch, etc., thereby ensuring that at the bend or bends, the cable is properly positioned so that its easily bent region is located at the bend or bends of the mandrel. Stated differently, the length of the straight region for a winding coil is N/2 multiplied by twist pitch, where N is an integer.

Note that for bending a conductor in a direction perpendicular to the first bending axis, the straight cable region can be less than half of the twist pitch (about ¼ the twist pitch) in order to bend the cable smoothly. For example, in FIG. 5(b), the cable is also bent along a second bending axis, which requires the bendable surface to be different than that used for the first bending axis.

In certain embodiments, the winding may be carried out automatically by feeding cable from a cable source with a suitable apparatus that may include a controller (not shown) in communication with a motor. The controller may have a processor and also may have a storage element electrically coupled thereto. The storage element may contain instructions and other information. The instructions may enable the controller to perform all of the steps, processes and methods described herein.

Figure 8:
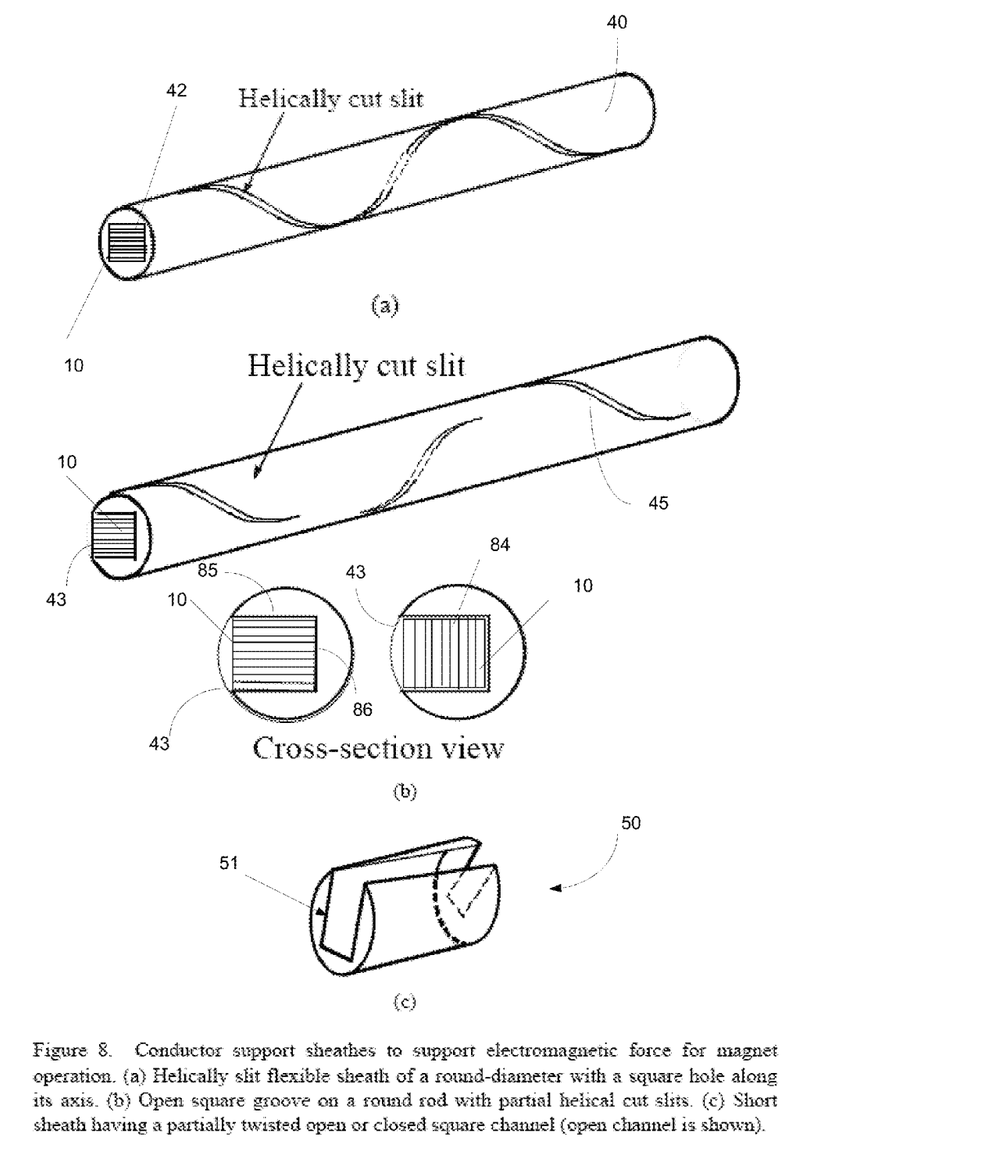
FIG. 8(a) is a perspective view of a helically slit flexible sheath of a round-diameter with a square hole along its axis.
FIG. 8(b) is cross-sectional view of an open square groove on a round rod with partial helical cut slits.
FIG. 8(c) is a perspective view of a sheath having a partially twisted open square channel.

Magnet conductors are exposed to very strong electromagnetic forces (Lorentz force) when in operation. In order to support the stacked twisted tape conductor, a winding groove channel cross-section may be made in a special way to fit well to the stacked tape twisted conductor on a winding mandrel. In certain embodiments, the conductor 10 can be in a flexible sheath 40 ideally having a round outside diameter with a square hole 42 along its axis, as illustrated in FIG. 8(a), in which superconducting cable 10 is embedded during twist-winding. The sheath 40 can be helically split to obtain better flexibility, since the sheath is also twisted with the stacked tape cable during magnet winding. The embodiment of FIG. 8(a) has a square hole 42 and the sheath tube is helically slit, while FIG. 8(b) illustrates another embodiment having an open square channel 43 on a round rod with partial helical cut slits 45. In the square channel 43, a stacked tape cable 10 is embedded such that the tape wide surface is parallel to (right insert in FIG. 8(b)) or perpendicular (left insert in FIG. 8(b)) to the bottom surface of the open channel. Suitable sheath materials include copper, aluminum, steel, stainless steel, titanium, titanium alloys, Inconel and Incoloy. They are not limited to metallic materials; they can be a non-metallic material such as plastic.

FIG. 8(b) shows the stacked tape cable, which includes a plurality of tapes 84, stacked on each other. This stacked tape cable has two different types of surfaces. The first, or bendable, surface 85 is the flat surface of the outermost tape and is illustrated as the top and bottom surfaces of the left insert. The second, or unbendable surface 86 is the side edges of thin tapes which is a cross-section of the stack tapes and is illustrated as the side surfaces of the left insert.

Instead of using a long piece of the support structure sheath like FIGS. 8(a) and (b), short pieces 50 having a partially twisted square channel 51 as shown in FIG. 8(c) may be slipped on the stacked twisted tape conductor during winding along a conductor. In the embodiment of FIG. 8(c), the short pieces have an open square groove, although the embodiments disclosed herein are not limited to an open groove. The groove can be a closed square groove channel like that shown in FIG. 8(a). In certain embodiments, the conductor with the slip-on pieces is fastened in a continuous manner during winding a cable on a winding mandrel (in a groove on a mandrel if a groove provided).

In certain embodiments, the magnet winding structure holder can be either electrically conductive or non-conductive material. The stacked-tape twist-wind conductor can be fixed with non-electrical material or electric material such as by soldering. Superconducting tapes have AC losses even if they are twisted. In order to reduce AC losses, for cables of embodiments disclosed herein, a superconducting tape striated using laser and photolithograph can be used. Superconducting tapes are not limited to High Temperature Superconductors (HTS) such as BSCCO and YBCO, but also may include any kind of superconducting tapes including $MgB_2$ and Fe-based superconducting wires, and furthermore flat Rutherford and ROEBEL cables are also suitable.

Figure 3:
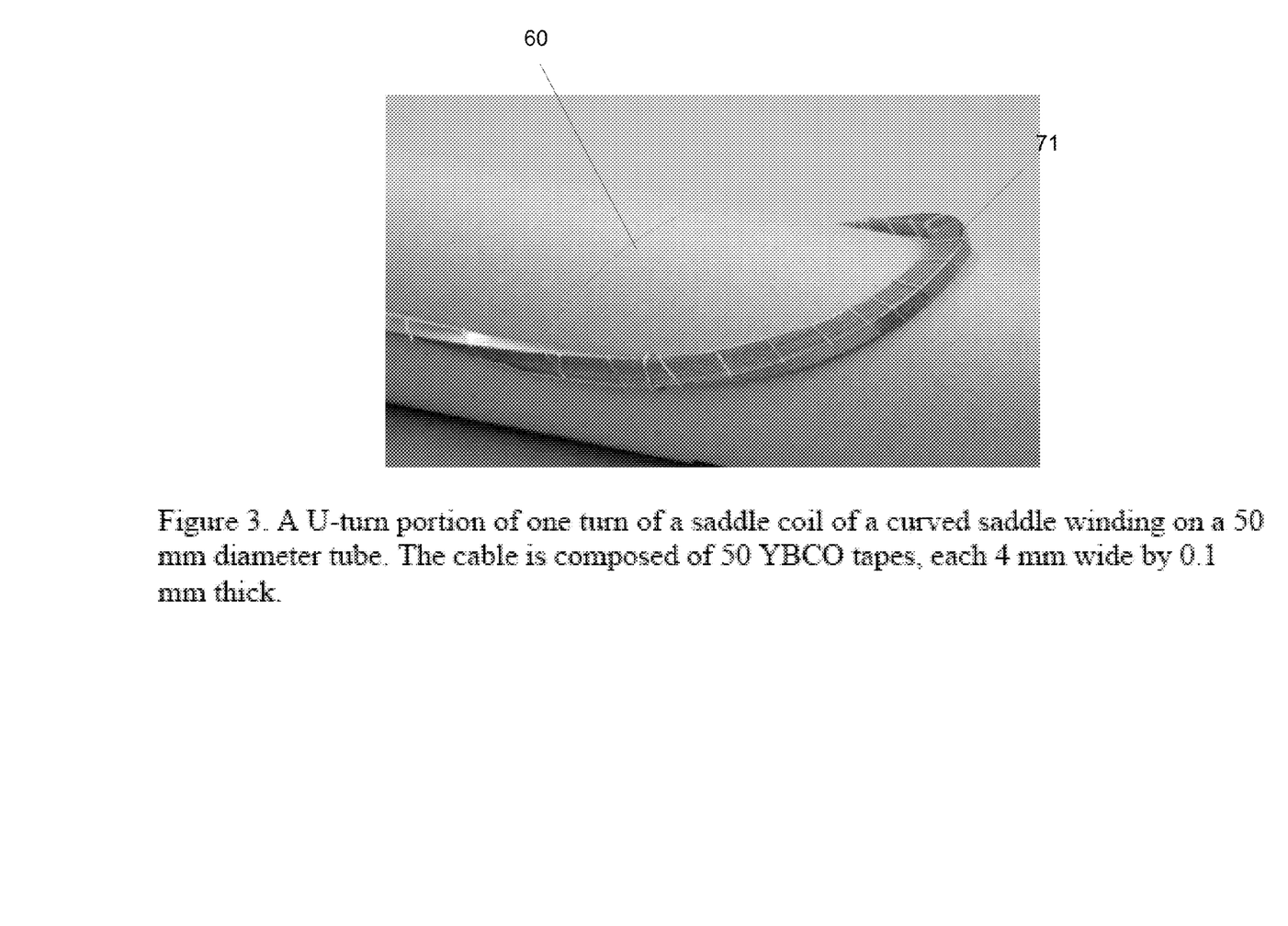
FIG. 3 is a photograph of the U-turn portion of a saddle coil of a curved saddle winding on a 50 mm diameter tube in accordance with certain embodiments.
Figure 4:
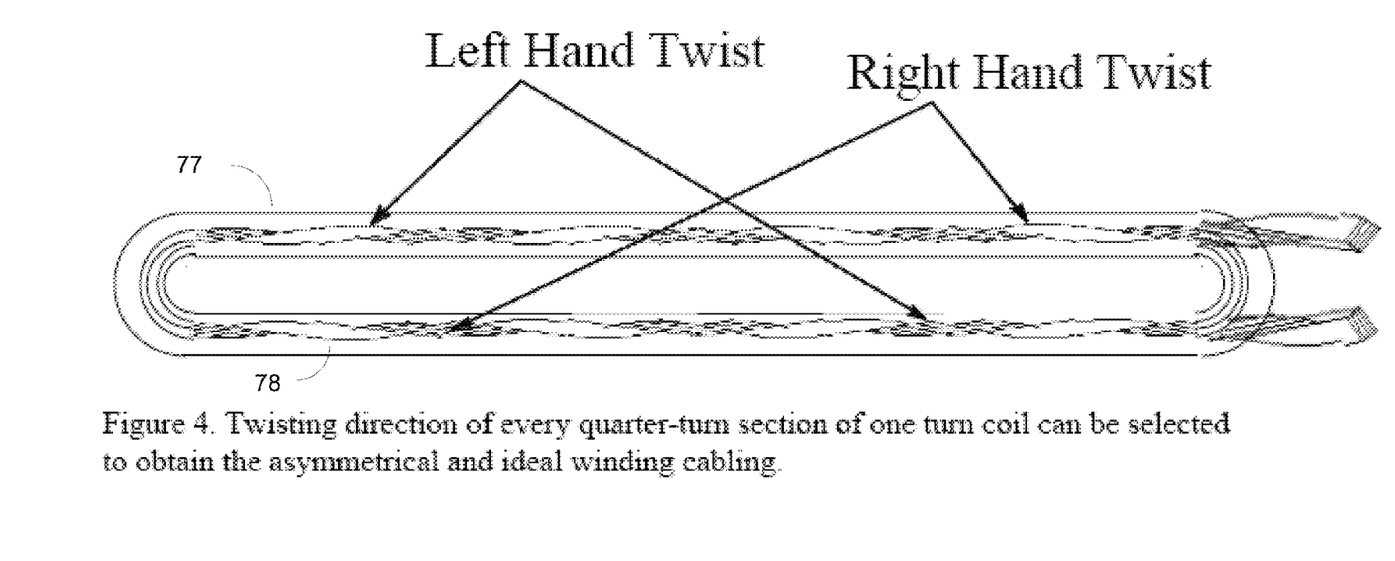
FIG. 4 is a schematic diagram showing the twisting direction of every quarter-turn section of a one turn coil.

The winding method of embodiments disclosed herein can be employed for the fabrication of the next generation high magnetic field coils and magnets, as it is possible to obtain the desired shape coils and magnets for those applications. In various magnet applications, such as HEP accelerator magnets and electric power machines of motors and generators, the typical dipole and quadrupole winding configurations are "racetrack" or "saddle". FIG. 3 shows a winding, fabricated with the technique described above, of a curved saddle winding on a 50 mm diameter tube 60, which shows a U-turn portion 71 of one turn of a saddle coil. The cable is a 50-tape (4 mm tape width) YBCO cable in which the tapes were stacked between two 0.51 mm thick copper strips. A curved saddle coil requires making complicated 3D curved windings in a circumferential direction on a circular tube. An advantage of the winding method disclosed herein is that it allows very sharp bending of about 25 mm diameter for 3D-bending curves by adjusting the twist pitch and direction. The twisting direction should be selected properly to obtain the desired winding configuration. In a 3D saddle coil, such as that shown in FIG. 3, the twisting direction of every quarter-turn section could be selected to fabricate the asymmetrical winding shape if desired, as illustrated in FIG. 4.

Example 1

Pentagon-Shaped Winding

Figure 5:
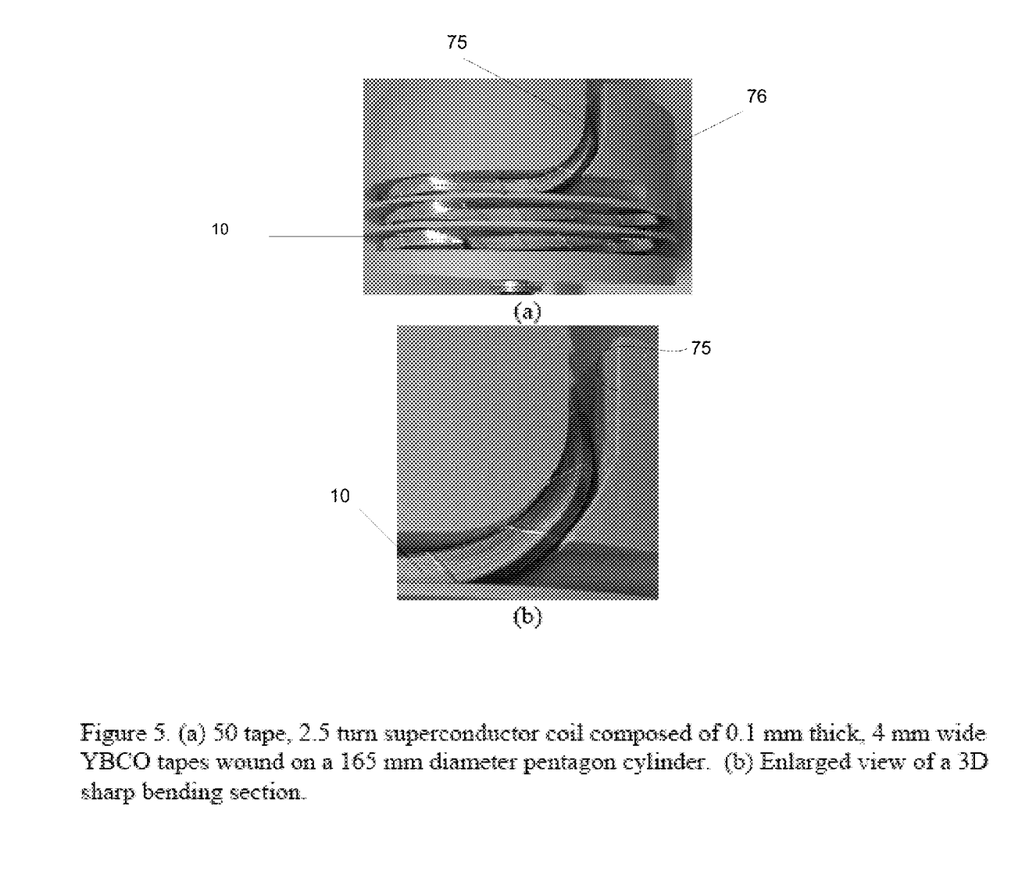
FIG. 5(a) is a photograph of a superconductor coil in accordance with certain embodiments.
FIG. 5(b) is an enlarged view of the coil of FIG. 5(a) showing a sharp bending section.

A pentagon-shaped winding using the TSTC (FIG. 5(a)) was fabricated using the winding method of embodiments disclosed herein. A winding sample holder was made out of an aluminum disk of 165 mm diameter and 76 mm length. A winding groove 75 (a half round groove 8.2 mm in diameter) was machined in a pentagonal shape on the circular cylinder 76. The pentagon shape winding former had about 3-turn grooves with the sides 96.5 mm in length and about 20 mm round corner radius. The grooves were formed to allow winding about multiple different axes as shown in FIG. 5(a). The entire surface of the aluminum sample holder was treated with a hard anodizing process to provide electric insulation.

A stacked-tape cable 10 was wound in the groove 75 and twisted as it was laid in the channel allowing for sharp bending. The cable 10 was composed of 50 SuperPower YBCO tapes. The tapes were stacked between two 0.51 mm thick copper strips. The stacked-tape cable was loosely wrapped with a fine stainless steel wire 0.23 mm in diameter (with a helical pitch of about 20 mm), so that the tapes could smoothly slip during twist-winding. The tape thickness and width were 0.1 mm and 4 mm, respectively. The stacked tape cable was bent at each corner as seen in FIG. 5(a) and twisted a half twist length at the 96.5 mm straight section. A 3D sharp bending section (about 25 mm radius) is shown in FIG. 5(b). It was easily and smoothly bent. A total of 2.5 turns were wound on the pentagon shape cylinder. The total cable length was 2.32 m of which 1.35 m was on the aluminum sample holder.

Example 2

Non Uniform Length Winding and Multi-Stage Cabled Conductor

Figure 6:
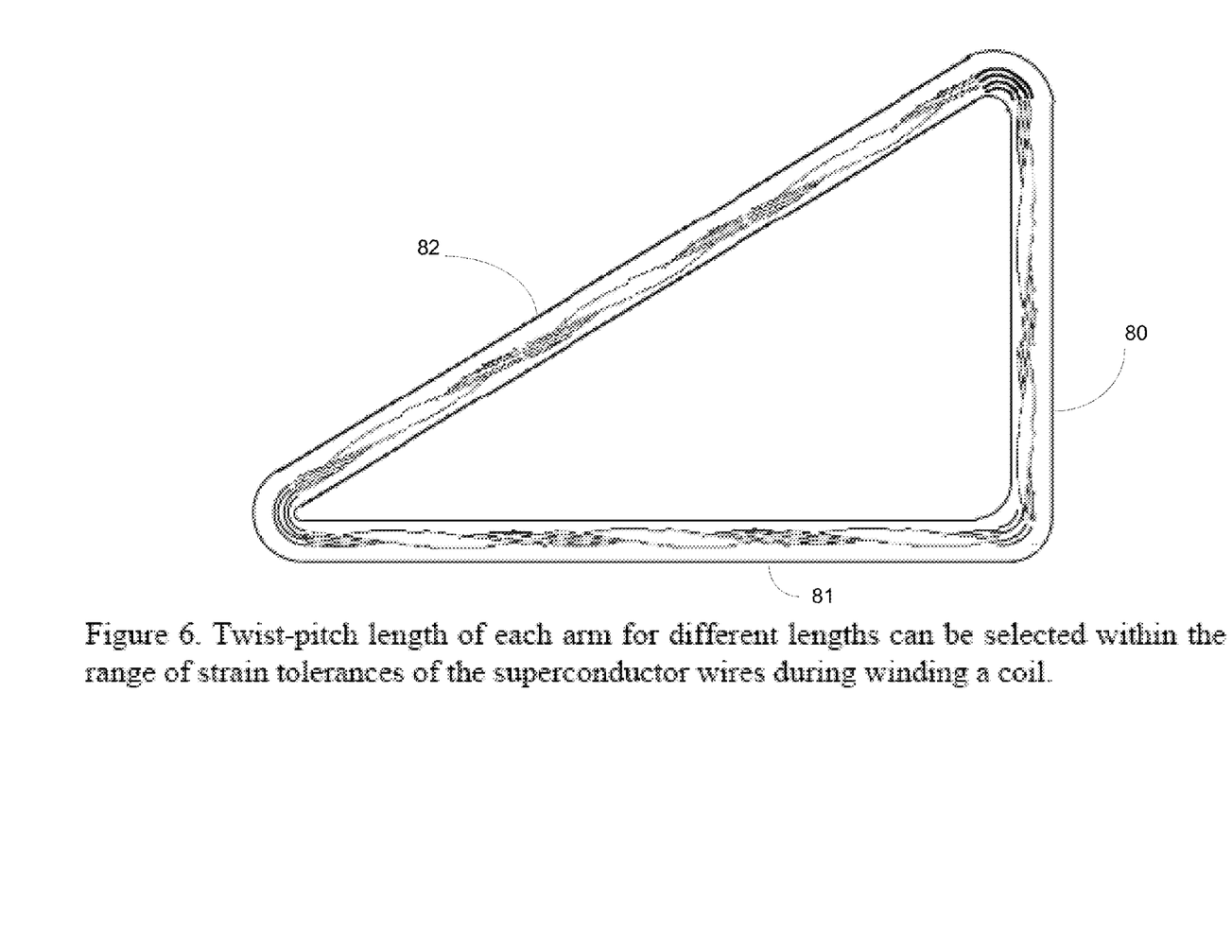
FIG. 6 is a schematic view of a coil in accordance with certain embodiments.

FIG. 4 shows an example of a coil composed of two arms 77, 78 of the same length. In this case the twist-pitch can be kept uniform. However, as illustrated in FIG. 6, three arms 81, 81 and 82 of a coil are composed of different lengths. The twist-pitch length of each arm can be selected within the range of strain tolerances of the superconductor wires during winding a coil.

Figure 7:
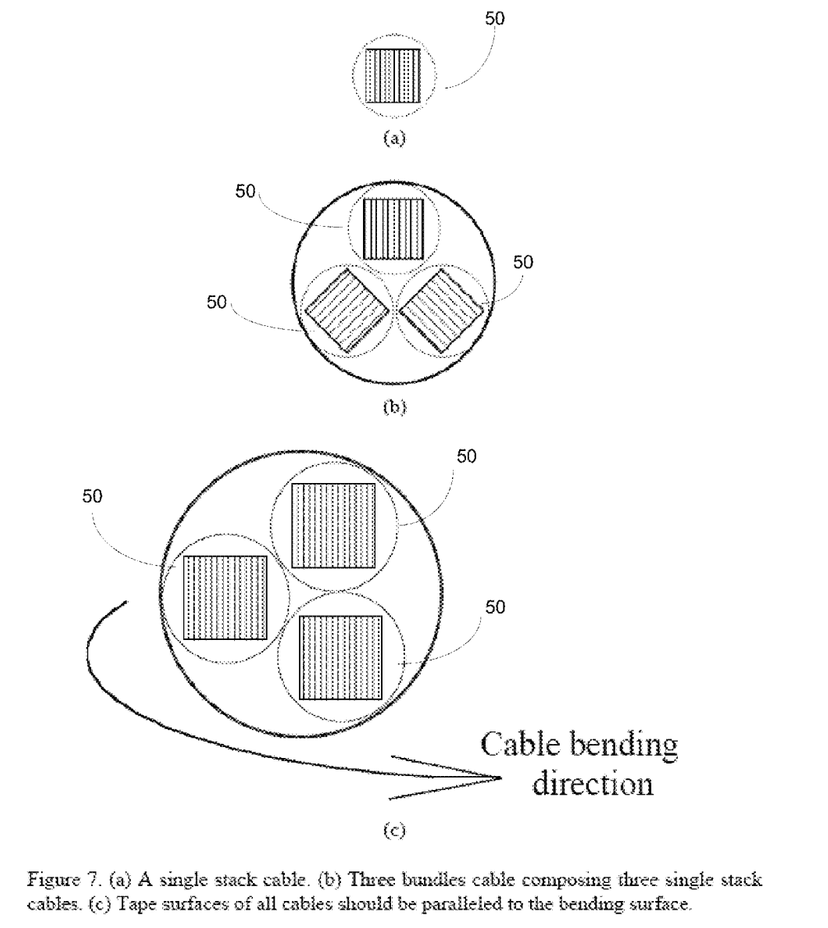
FIG. 7(a) is a schematic diagram of a single stack cable.
FIG. 7(b) is a schematic diagram of three bundles of cable composed of three single stack cables.
FIG. 7(c) is a schematic diagram of three bundles of capable composed of three single stack cables oriented in a certain manner.

Stacked tape conductor is not limited to a single stack 50 shown in FIG. 7(a). Multiple-stage cable, for example a three-bundle cable shown in FIG. 7(b) can be used. In this case tape orientations of all stacks 50 should be controlled to face the bending surface as illustrated in FIG. 7(c). In other words, the bendable surfaces of the stacks 50 are all aligned so that the bendable surfaces of each are all parallel to each other. This alignment may enable easier bending than the configuration shown in FIG. 7(b).

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Furthermore, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A method of fabricating an electromagnetic coil using a superconductor cable comprising a plurality of flat, tape-shaped ribbon superconductor wires assembled to form a stack having a rectangular cross-section and a longitudinal axis, said method comprising:
providing a support surface about which said cable is to be wound, said support surface having at least one corner and at least one substantially straight portion;
winding said cable about said support surface by bending said cable about said corner without twisting said cable, and twisting said cable in said substantially straight portion about said longitudinal axis.

2. The method of claim 1, wherein said twisting of said cable produces a twist pitch, and wherein said straight portion has a length, and wherein said cable is twisted such that said length is half of said twist-pitch of said cable or a multiple thereof, wherein the multiplier is an integer.

3. The method of claim 1, wherein said supporting surface has a plurality of corners spaced apart by straight portions.

4. The method of claim 1, wherein said support surface is shaped as a polygon.

5. The method of claim 4, wherein said polygon is selected from the group consisting of a triangle, rectangle, pentagon, hexagon and octagon.

6. The method of claim 1, wherein said superconductor cable is enclosed within a flexible sheath.

7. The method of claim 2, wherein said support surface comprises a second straight portion, having a second length different than said length of said straight portion, said method further comprising varying said twist pitch for each of said straight portions.

8. The method of claim 1, wherein said stack has a first bendable surface and a second unbendable surface, said method further comprising disposing said first bendable surface against said support surface at said corner.

9. The method of claim 1, wherein a bending direction is varied during said winding.

10. An electromagnetic coil comprising:
a mandrel having a substantially straight portion and a corner;
a plurality of flat, tape-shaped ribbon superconductor wires assembled to form a stack having a rectangular cross section, said stack being wound about said mandrel such that the portion of said stack wound about said substantially straight portion of said mandrel is twisted about a longitudinal axis of the stack, and the portion of said stack that is wound about said corner of said mandrel is not twisted.

11. The electromagnetic coil of claim 10, wherein said twisting of said stack produces a twist pitch, and wherein said substantially straight portion has a first length, and wherein said stack is twisted such that said first length is half of said twist-pitch of said cable or a multiple thereof, wherein the multiplier is an integer.

12. The electromagnetic coil of claim 10, wherein said stack is enclosed in a flexible sheath.

13. The electromagnetic coil of claim 12, wherein the sheath has a round outside diameter with a square hole along its longitudinal axis.

14. The electromagnetic coil of claim 12, wherein the sheath has a round outside diameter sheath with an open square groove along its longitudinal axis.

15. The electromagnetic coil of claim 10, wherein said mandrel comprises grooves disposed on its outer surface, and wherein said stack is disposed in said grooves.

16. The electromagnetic coil of claim 10, further comprising a second stack comprising a plurality of flat, tape-shaped ribbon superconductor wires, wherein said stack and said second stack are enclosed in a single sheath.

17. The electromagnetic coil of claim 16, wherein said stack and said second stack each have a repetive first bendable surface and a second unbendable surface, and wherein said first bendable surfaces are aligned so as to be parallel to one another.

* * * * *